(12) United States Patent
Yu et al.

(10) Patent No.: US 9,573,303 B2
(45) Date of Patent: Feb. 21, 2017

(54) MANUFACTURING METHOD FOR METAL AND PLASTIC COMPOSITE BODIES

(71) Applicants: Hyundai Motor Company, Seoul (KR); Kia Motors Corporation, Seoul (KR); Hankook National Co., Ltd., Icheon-si (KR)

(72) Inventors: Byung Seob Yu, Osan-si (KR); Yang Gi Lee, Suwon-si (KR); Chan Mook Choi, Incheon (KR); Hyung Chul Kim, Seoul (KR)

(73) Assignees: Hyndai Motor Company, Seoul (KR); Kia Motors Corporation, Seoul (KR); Hankook National Co., Ltd., Icheon-si (KR)

( * ) Notice: Subject to any disclaimer, the term of this patent is extended or adjusted under 35 U.S.C. 154(b) by 0 days.

(21) Appl. No.: 14/942,762

(22) Filed: Nov. 16, 2015

(65) Prior Publication Data
US 2016/0221235 A1  Aug. 4, 2016

(30) Foreign Application Priority Data
Jan. 30, 2015 (KR) .................. 10-2015-0014797

(51) Int. Cl.
*B29C 65/70* (2006.01)
*B44C 1/22* (2006.01)
(Continued)

(52) U.S. Cl.
CPC .......... *B29C 45/14311* (2013.01); *C23F 1/20* (2013.01); *B29C 2045/14868* (2013.01); *B29K 2705/02* (2013.01)

(58) Field of Classification Search
CPC .................................................. B29C 65/70
(Continued)

(56) References Cited

U.S. PATENT DOCUMENTS

| 7,205,180 B1 * | 4/2007 | Sirinorakul ......... H01L 21/4835 257/E23.031 |
| 2015/0173246 A1 * | 6/2015 | Jang .................. H05K 7/20436 361/715 |

(Continued)

FOREIGN PATENT DOCUMENTS

| JP | 2007-182071 A | 7/2007 |
| KR | 10-2003-0077664 A | 10/2003 |

(Continued)

OTHER PUBLICATIONS

Nussinov, "A glassy counterpart to supersolids", American Physical Society, Physics 1, 40 (2008).*

*Primary Examiner* — Thomas Pham
(74) *Attorney, Agent, or Firm* — Morgan, Lewis & Bockius LLP

(57) ABSTRACT

A manufacturing method of metal and plastic composite bodies integrated by etching a surface of a metal member and forming a thermoplastic resin on an etching surface may include forming a printing layer which prints a pattern or a character on an exposed surface of a metal member and a protective layer for protecting the printed pattern thereon, grease-removing and cleaning to remove a passivation oxidized film at a rear side of the metal member to be integrally coupled with a plastic portion, surface-treating a surface by using and etching a ferric chloride solution in a range of pH 3 to 4.5 so as to form a minute unevenness at the rear side, removing a smut generated in the surface-treating process, and molding for integrally forming the plastic portion with the metal member.

4 Claims, 3 Drawing Sheets

(51) Int. Cl.
*C23F 1/00* (2006.01)
*C03C 15/00* (2006.01)
*C03C 25/68* (2006.01)
*C25F 3/00* (2006.01)
*B29C 45/14* (2006.01)
*C23F 1/20* (2006.01)
*B29K 705/02* (2006.01)

(58) Field of Classification Search
USPC .......................................................... 216/102
See application file for complete search history.

(56) References Cited

U.S. PATENT DOCUMENTS

2015/0224742 A1* 8/2015 Inoue ................ B29C 45/14311
428/687
2016/0107342 A1* 4/2016 Chiang ............... B29C 37/0078
428/613

FOREIGN PATENT DOCUMENTS

| KR | 10-2009-0027317 A | 3/2009 |
| KR | 10-2009-0085663 A | 8/2009 |
| KR | 10-2011-0043530 A | 4/2011 |
| KR | 10-2011-0133457 A | 12/2011 |
| KR | 10-2012-0076198 A | 7/2012 |
| KR | 10-2012-0138544 A | 12/2012 |
| KR | 10-2014-0081674 A | 7/2014 |

* cited by examiner

MANUFACTURING METHOD FOR METAL AND PLASTIC COMPOSITE BODIES

CROSS-REFERENCE TO RELATED APPLICATION

The present application claims priority to Korean Patent Application No. 10-2015-0014797 filed Jan. 30, 2015, the entire contents of which is incorporated herein for all purposes by this reference.

BACKGROUND OF THE INVENTION

Field of the Invention

The present invention relates to a manufacturing method of a composite body which is integrally formed with metal and plastic materials, and more particularly, to a manufacturing method of a composite body in which a plastic material is physically coupled and integrated on an aluminum substrate with improved coupling structure without discharging environmental pollutants.

Description of Related Art

Generally, in a component such as a case of an electronic device or household appliance or an interior material of a vehicle, and a side mirror, a beautiful appearance in addition to durability and corrosion resistance is very important, and the component is formed of a composite body of a metal material such as aluminum or magnesium and plastic.

In a composite body of metal and plastic in the related art, generally, a plastic material adheres to the metal material by an adhesive, but there are problems in that a thickness is increased by an adhesive layer and adhesion of the adhesive is decreased according to a use environment or the plastic material may be easily separated from the metal material by impact, and an adhesive interface thereof is exposed and it is poor in appearance.

As another method of forming the metal and plastic composite body in the related art, there is an insert-injection method of inserting the metal material into the mold and injecting the plastic material, but it is difficult to configure a structural shape for stronger coupling between the metal and plastic portions so as not to be exposed outside.

As such, a method of configuring metal and plastic as a composite body without using the adhesive has been required.

The related art discloses a manufacturing method of an aluminum and resin injection integrated molding product in which has an aluminum shaped body made of an aluminum alloy having a plurality of concave shaped portions due to an uneven portion formed on a surface and a resin molding body which is integrally installed by injection-molding a thermoplastic resin on the surface of the aluminum shaped body and formed with an inserting portion of the resin molding body solidified by inserting the thermoplastic resin into the concave shaped portions, in which the aluminum shaped body and the resin molding body are hooked to each other by the concave shaped portion and the inserting portion.

Further, related art discloses a manufacturing method of an anti-corrosion composite body configured by shaping a magnesium alloy component form a casting material or an intermediate material, immersing and chemical-etching the shaped component in an acidic aqueous solution, attaching and forming a thin layer having manganese oxide as a main component on the surface by immersing the chemical-etched component in the aqueous solution including potassium permanganate, inserting the component forming the thin layer into the injection mold, injecting one kind selected from a resin composition using polyphenylene sulfide as a main component, a resin composition using polybutylene terephthalate as a main component, and a resin composition an aromatic polyamide resin as a main component, and integrally fixing the magnesium alloy component and the resin composition, and re-immersing and chemical-treating the integrally fixed composite body in a chemical-treating liquid for a magnesium alloy.

However, in the manufacturing method of the composite body in the related art, in order to form the unevenness on the metal surface, etching is performed by using an acidic aqueous solution, and in this case, acidic waste water is discharged and an environmental pollution problem is caused, and a working environment is poor, and a lot of costs in waste water treatment are required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a manufacturing method of metal and plastic composite bodies which is improved to increase a physical coupling strength of the metal and the plastic without causing a problem of environmental pollution.

According to various aspects of the present invention, a manufacturing method of metal and plastic composite bodies integrated by etching a surface of a metal member and forming a thermoplastic resin on an etching surface may include forming a printing layer which prints a pattern or a character on an exposed surface of a metal member and a protective layer for protecting the printed pattern thereon, grease-removing and cleaning to remove a passivation oxidized film at a rear side of the metal member to be integrally coupled with a plastic portion, surface-treating a surface by using and etching a ferric chloride solution in a range of pH 3 to 4.5 so as to form a minute unevenness at the rear side, removing a smut generated in the surface-treating process, and molding, for integrally forming the plastic portion with the metal member.

In the forming the printing layer, the protective layer may be formed by printing a pattern on the exposed surface of the metal member and coating the pattern with a coating matter in order to prevent the pattern printed on an upper surface from spreading and protect from the damage to the pattern.

In the molding for integrally forming the plastic portion with the metal member, a mold may be maintained at 100±20° C.

The resin injected in the molding for integrally forming the plastic portion with the metal member may be maintained at a melting temperature or more in a molten state to be deeply penetrated into an unevenness of the metal member formed by the surface-treatment.

In order to increase a coupling area and a coupling force of the plastic material and the metal member, minute slots, scratches, or grooves may be formed on the surface of the metal member in advance before the grease-removing and cleaning, and in the surface-treating, more minute grooves may be more deeply formed on the surface of the metal member by performing etching on the surface.

According to the various embodiments of the present invention, a resin melting liquid is penetrated into a minute uneven structure formed by surface-treatment in which a metal surface is corroded with ferric chloride to be firmly physically coupled, and a pattern is printed and coated before surface-treating the entire surface, and as a result, it is possible to prevent the damage to an appearance during surface-treatment, maintain unique polish and property of metal, and have high quality. Further, surface-treatment is performed by ferric chloride usable as a coagulant to prevent a problem of environmental pollution as compared with surface-treatment using hydrochloric acid or sulfuric acid and nitric acid in the related art.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In a manufacturing method of metal and plastic composite bodies of the present invention, in a vehicle interior material, for example, a plastic material is disposed on an inner surface and a metal, for example, an aluminum material is disposed at the outside to be integrally coupled with each other, or in a side mirror cover, an outer side of an internal aluminum material is integrally formed with the plastic material to coat the outer surface.

Figure 1:
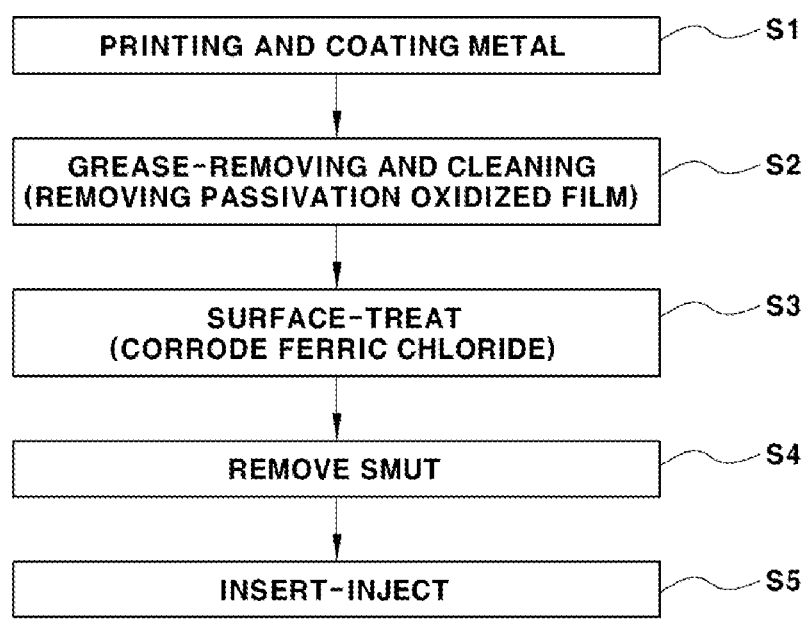
FIG. 1 is a block diagram schematically illustrating an exemplary method of manufacturing metal and plastic composite bodies according to the present invention.
Figure 2:
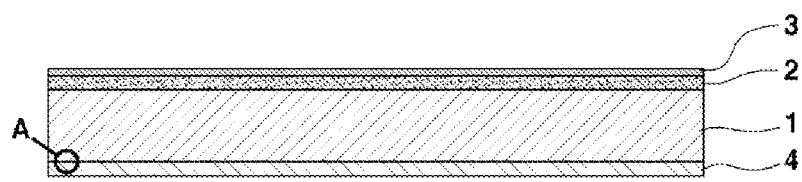
FIG. 2 is a schematic cross-sectional view of a composite body manufactured by the exemplary method of FIG. 1.

In FIGS. 1 and 2, the manufacturing method of metal and plastic composite bodies of the present invention includes forming a printing layer 2 which prints a pattern or a character on an exposed surface of a metal member 1 and a protective layer 3 for protecting the printed pattern thereon (S1), grease-removing and cleaning a rear side of the metal member 1 to be integrally coupled with a plastic portion (S2), surface-treating a surface of the rear side (S3), removing oxide, that is, smut generated in the surface-treating process (S4), and molding for integrally forming the plastic portion at the metal member 1 (S5).

In step S1, the printing layer 2 is formed by silk-printing a company logo, a company name, or other patterns on the exposed surface and coating a coating matter in order to prevent the pattern printed on the upper surface from spreading and protect the damage to the pattern. The protective layer may be formed, for example, by super-glass coating and preferably has corrosion resistance and proper hardness. As such, it is possible to prevent the damage of the printed matter and maintain unique polish and property of the metal by coating before the surface-treating process to be described below.

In step S2, for integrating the plastic material 4 formed in a subsequent process, the inner surface of the metal member is corroded and the grease-removing and cleaning process is performed as a pretreatment for the corrosion. Since a passivation oxidized film having high corrosion resistance is formed on the metal surface, corrosion is not smoothly performed, and generally, the passivation oxidized film is removed by using a surfactant or sodium hydride.

Figure 3:
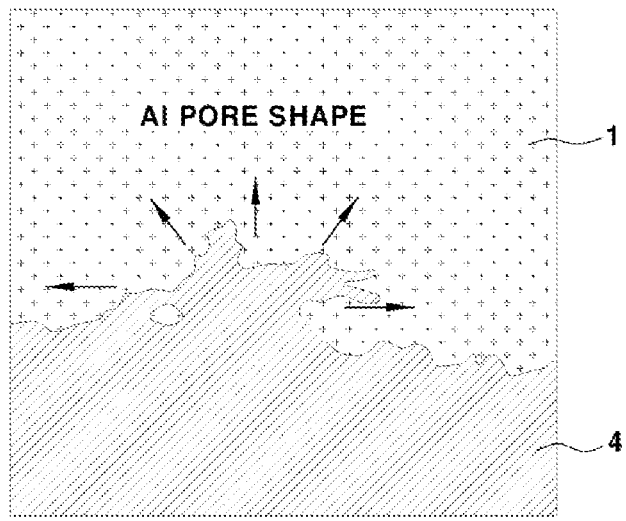
FIG. 3 is an enlarged photograph of a cross section where a plastic material formed integrally after aluminum surface treatment is coupled with aluminum according to the present invention.

The step S3 is a surface-treating process of corroding the surface of the rear side of the grease-removed and cleaned metal member, and a ferric chloride solution is used according to the present invention unlike a general surface-treating method which is performed by hydrochloric acid, sulfuric acid, nitric acid solutions, and in this case, the ferric chloride solution has pH 7 or less, preferably pH 3 to 4.5. Since an etching speed is decreased under the acidity smaller than the pH value, the range is preferable in order to obtain a proper etching speed. Further, since the etching speed is decreased as the temperature of the aqueous solution is increased, the temperature may be maintained at a temperature, for example, 70° C. or less. In the present invention, since the ferric chloride solution used in the etching process is collected and may be reused as a coagulant, as compared with simply using hydrochloric acid, sulfuric acid, and nitric acid as an etchant in the related art, environmental pollution may be reduced. FIG. 3 is a micrograph illustrating forming a minute unevenness structure by surface-treating aluminum with a ferric chloride solution according to the present invention.

In the surface-treating process, a smut generated by surface-treating aluminum with the ferric chloride solution is removed by a steel sponge, a general smut remover, or an acidic aqueous solution in step S4 and may be removed by the acidic aqueous solution for stronger physical coupling than coupling with plastic in a subsequent process. Further, in order to prevent additional corrosion, cleaning is required. As a result, a minute unevenness is formed on the metal member 1.

Next, in step S5, the etched metal member is disposed in a mold of the metal member 1 of aluminum formed in the pre-processes to be insert-injected with a thermoplastic resin or an acrylic resin, and as a result, the plastic material is penetrated into the minute unevenness formed on the metal member to be physically coupled and integrated with the metal member. In this case, the mold is maintained at 100±20° C., and meanwhile, the injected resin is maintained at a melting temperature or more and becomes in a molten state to be deeply penetrated into the unevenness of the metal member.

As such, since the mold is maintained at the high temperature, the metal member therein is swollen, the minute unevenness formed on the surface is expanded, the plastic material is penetrated into the unevenness and cooled, thereby obtaining more rigid coupling.

A component or a material in which the plastic material is physically coupled and integrated with the metal member is obtained through the processes.

As a modified example, in order to increase coupling force of the plastic material and the metal member, minute slots, scratches, or grooves are formed on the surface of the metal member in advance, more minute grooves are more deeply formed on the surface of the metal member by performing etching on the surface, and as a result, the etching surface is increased. Accordingly, a coupling area and coupling force of the plastic material and the metal member may be increased.

Figure 4:
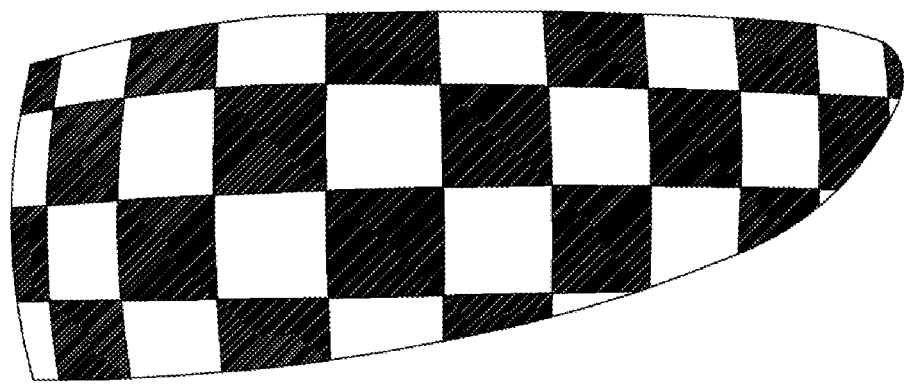
FIG. 4 and FIG. 5 are front and rear photographs of a scalp member which is fixed to a vehicle side mirror manufactured by the exemplary method of FIG. 1.
Figure 5:
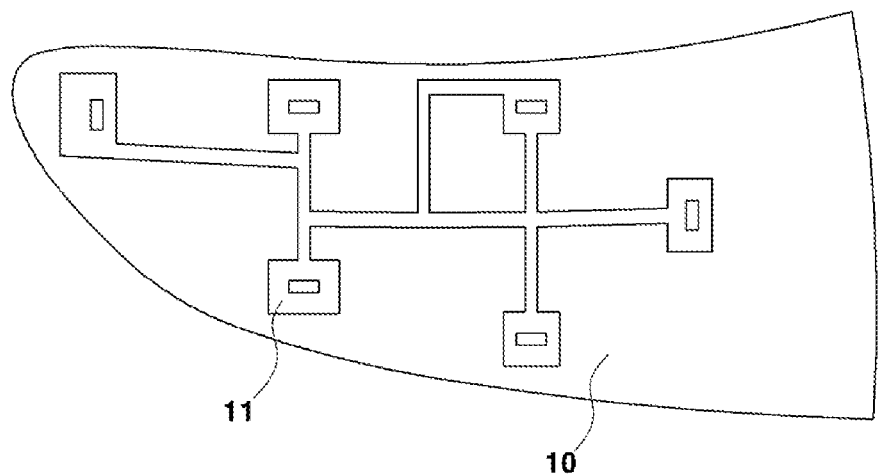

FIGS. 4 and 5 are front and rear photographs of a scalp member which is fixed to a vehicle side mirror manufactured by the method of FIG. 1, and since vehicle painting is entirely performed on an outer surface of the vehicle side mirror, it is difficult to detect a separate pattern or design. As a result, when any pattern is detected on the outer surface of the side mirror, as illustrated in FIGS. 4 and 5, a scalp member is prepared by printing a desired pattern on the outer surface and coating the protective layer to be attached on a mirror housing. In this case, when coupling elements such as a hook 11 made of a plastic material is attached onto the rear side of a metallic body 10 of the scalp member by using an adhesive means such as an adhesive or a double-sided tape, an adhering portion may be detached according to a use environment such as a temperature and humidity and removed due to deterioration of adhesion according to a lapse of a use period. As a result, according to the method of the present invention, the scalp member is prepared by surface-treating a rear side of an aluminum body 10, integrating hooks 11 to the body to be connected to each other in a line, and printing and coating the desired pattern on the outer surface of the body.

The present invention may be applied to manufacture metal and plastic composite bodies for an interior material or an exterior material of the vehicle in order to express increased rigidness and a sense of beauty.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A manufacturing method of integrating metal and plastic composite bodies by etching a surface of a metal member and forming a thermoplastic resin on an etching surface, the manufacturing method comprising:
   forming a printing layer which prints a pattern or a character on an exposed surface of a metal member, and forming a protective layer for protecting the printed pattern thereon;
   grease-removing and cleaning to remove a passivation oxidized film at a rear side of the metal member to be integrally coupled with a plastic portion;
   surface-treating the exposed surface by using a ferric chloride solution in a range of pH 3 to 4.5 so as to form an unevenness at the rear side;
   removing a smut generated in the surface-treating process; and
   molding the plastic portion with the metal member, wherein the printing layer is formed by printing a pattern on the exposed surface of the metal member and the protective layer is formed on the printing layer by coating the pattern with a coating matter in order to prevent the pattern printed on an upper surface from spreading and protect from damage to the pattern, wherein the metal member is made of an aluminum material, and wherein the coating matter is a super-glass material.

2. The manufacturing method of claim 1, wherein in the molding for integrally forming the plastic portion with the metal member, a mold is maintained at 100±20° C.

3. The manufacturing method of claim 2, wherein the thermoplastic resin injected in the molding for integrally forming the plastic portion with the metal member is maintained at a melting temperature or more in a molten state to be deeply penetrated into an unevenness of the metal member formed by the surface-treatment.

4. The manufacturing method of claim 2, wherein in order to increase a coupling area and a coupling force of the plastic material and the metal member, slots, scratches, or grooves are formed on the surface of the metal member in advance before the grease-removing and cleaning, and in the surface-treating, more grooves are more deeply formed on the surface of the metal member by performing etching on the surface.

* * * * *